(12) United States Patent
Iwasaki et al.

(10) Patent No.: US 12,457,409 B2
(45) Date of Patent: Oct. 28, 2025

(54) IMAGE PICKUP APPARATUS THAT IS EQUIPPED WITH DETECTION UNIT, WHICH DETECTS STATE OF USER, AND HAS LAYOUT, WHICH PREVENTS DETECTION UNIT FROM BEING BLOCKED BY HAND OF USER

(71) Applicant: CANON KABUSHIKI KAISHA, Tokyo (JP)

(72) Inventors: Shogo Iwasaki, Tokyo (JP); Daisuke Nishioka, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 79 days.

(21) Appl. No.: 18/581,808

(22) Filed: Feb. 20, 2024

(65) Prior Publication Data

US 2024/0292080 A1   Aug. 29, 2024

(30) Foreign Application Priority Data

Feb. 27, 2023   (JP) ................. 2023-028405

(51) Int. Cl.
| | |
|---|---|
| *H04N 23/611* | (2023.01) |
| *G03B 13/02* | (2021.01) |
| *H04N 23/51* | (2023.01) |
| *H04N 23/53* | (2023.01) |
| *H04N 23/54* | (2023.01) |
| *H04N 23/63* | (2023.01) |

(52) U.S. Cl.
CPC ........... *H04N 23/611* (2023.01); *G03B 13/02* (2013.01); *H04N 23/51* (2023.01); *H04N 23/531* (2023.01); *H04N 23/54* (2023.01); *H04N 23/63* (2023.01)

(58) Field of Classification Search
CPC .... H04N 23/51; H04N 23/611; H04N 23/531; H04N 23/54; H04N 23/63; G03B 13/02; G03B 17/02
USPC ........................................ 348/222.1
See application file for complete search history.

(56) References Cited

U.S. PATENT DOCUMENTS

| | | | |
|---|---|---|---|
| 6,215,524 B1 * | 4/2001 | Shiozaki ............. | H04N 23/531 |
| | | | 348/E5.025 |
| 7,155,253 B2 * | 12/2006 | Sawayama ............. | G06F 1/169 |
| | | | 348/14.02 |

(Continued)

FOREIGN PATENT DOCUMENTS

JP   2004166139 A   6/2004

*Primary Examiner* — Pritham D Prabhakher
(74) *Attorney, Agent, or Firm* — Cowan, Liebowitz & Latman, P.C.

(57) ABSTRACT

An image pickup apparatus having a layout preventing a detection unit from being blocked is provided. The image pickup apparatus including a housing and a display unit disposed on a rear surface of the housing includes a user state detection unit to detect a state of a user, a rear surface gripping portion disposed on a right side on a substantial extension line in a longitudinal direction of the display unit, and a front surface gripping portion disposed on a front surface of the housing and corresponding to the rear surface gripping portion. The user state detection unit is disposed at a position closer to a left side of the display unit than to a right side thereof and preventing a detection range of the user state detection unit from being blocked by a hand of the user when the user grips and operates the image pickup apparatus.

18 Claims, 14 Drawing Sheets

(56) References Cited

U.S. PATENT DOCUMENTS

| | | | |
|---|---|---|---|
| 7,158,083 B2* | 1/2007 | Satoh | H01Q 3/08 |
| | | | 343/702 |
| 10,911,648 B2* | 2/2021 | Nakashima | H04N 23/63 |
| 11,029,907 B2* | 6/2021 | Myung | G06F 3/0346 |
| 11,283,998 B2* | 3/2022 | Ueda | H04N 23/55 |
| 11,323,597 B2* | 5/2022 | Kawahara | H04N 23/531 |
| 11,770,612 B1* | 9/2023 | Desai | H04N 23/62 |
| | | | 348/208.4 |
| 2004/0014488 A1* | 1/2004 | Sawayama | G06F 1/1698 |
| | | | 348/E7.078 |
| 2006/0097927 A1* | 5/2006 | Satoh | H01Q 1/084 |
| | | | 343/702 |
| 2007/0032277 A1* | 2/2007 | Sawayama | G06F 1/1688 |
| | | | 455/575.3 |
| 2011/0050974 A1* | 3/2011 | Nakai | H04N 23/531 |
| | | | 348/E5.025 |
| 2020/0050416 A1* | 2/2020 | Myung | G06F 3/04886 |
| 2020/0106938 A1* | 4/2020 | Nakashima | H04N 23/531 |
| 2020/0336640 A1* | 10/2020 | Kawahara | H04N 23/531 |
| 2021/0227138 A1* | 7/2021 | Ueda | H04N 23/60 |
| 2021/0250491 A1* | 8/2021 | Shigematsu | H04N 23/635 |
| 2023/0409188 A1* | 12/2023 | Dias Moises | G06F 3/017 |

* cited by examiner

IMAGE PICKUP APPARATUS THAT IS EQUIPPED WITH DETECTION UNIT, WHICH DETECTS STATE OF USER, AND HAS LAYOUT, WHICH PREVENTS DETECTION UNIT FROM BEING BLOCKED BY HAND OF USER

BACKGROUND OF THE INVENTION

Field of the Invention

The present invention relates to an image pickup apparatus equipped with an in-camera that detects a state of a photographer (a user).

Description of the Related Art

Conventionally, many image pickup apparatuses have been proposed in which a display unit such as a liquid crystal display (an LCD) is provided on the photographer side and an in-camera is disposed in the vicinity of the display unit. The in-camera is a camera installed inside a smartphone or a camera device, is mainly used to photograph the user himself/herself, and has a certain level of image quality. By using the in-camera, it is possible to perform photographing of the user himself/herself, to grasp (understand) a state of the user (whether or not the user is near the image pickup apparatus, whether or not the user is in a photographing standby state, and the like), and to cause the image pickup apparatus to perform various kinds of operations based on the photographed facial expression of the user.

For example, according to a technique disclosed in Japanese Laid-Open Patent Publication (kokai) No. 2004-166139, a mobile terminal apparatus, which includes a display unit provided on a main surface thereof facing the user side in a state in which the user holds the mobile terminal apparatus and an in-camera provided therein and configured to photograph a subject facing the display unit, has been disclosed. In addition, the mobile terminal apparatus disclosed in Japanese Laid-Open Patent Publication (kokai) No. 2004-166139 has a configuration that prevents an audio input to a microphone portion from being blocked by a hand of the user covering the microphone portion.

However, although the mobile terminal apparatus disclosed in Japanese Laid-Open Patent Publication (kokai) No. 2004-166139 has the configuration that prevents the audio input to the microphone portion from being blocked by the hand of the user covering the microphone portion, a specific positional relationship of the display unit and a camera unit (an image pickup unit) with respect to a gripping portion is not disclosed. For this reason, when the photographer (hereinafter, also referred to as "the user") grips a housing of the mobile terminal apparatus or performs an operation of the mobile terminal apparatus, there is a concern that even in the case that a high-performance camera unit is used, it will not be able to demonstrate its high performance when the camera unit is unintentionally covered with the hand of the photographer (the user).

SUMMARY OF THE INVENTION

The present invention provides an image pickup apparatus that is equipped with a detection unit, which detects a state of a user, and has a layout, which prevents the detection unit from being blocked by a hand of the user.

Accordingly, the present invention provides an image pickup apparatus including a housing and a display unit, which has a horizontally long rectangular shape and is disposed on a rear surface of the housing, the image pickup apparatus comprising a user state detection unit configured to detect a state of a user, a rear surface gripping portion disposed on a right side on a substantial extension line in a longitudinal direction of the display unit, and a front surface gripping portion, which is disposed on a front surface of the housing and corresponds to the rear surface gripping portion. The rear surface gripping portion is configured to be connected to the front surface gripping portion via a housing side surface on an extension line in the longitudinal direction of the display unit. The front surface gripping portion has at least one of a convex shape and a concave shape. The user state detection unit is disposed at a position, which is closer to a left side of the display unit than to a right side of the display unit and prevents a detection range of the user state detection unit from being blocked by a hand of the user when the user grips and operates the image pickup apparatus.

According to the present invention, the effect of being able to provide the image pickup apparatus that is equipped with the detection unit, which detects the state of the user, and has the layout, which prevents the detection unit from being blocked by the hand of the user is obtained.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof.

Hereinafter, preferred embodiments of the present invention will be described in detail with reference to the drawings. However, configurations described in the following preferred embodiments are merely examples, and the scope of the present invention is not limited by the configurations described in the following preferred embodiments. First, a first embodiment of the present invention will be described.

Figure 1:
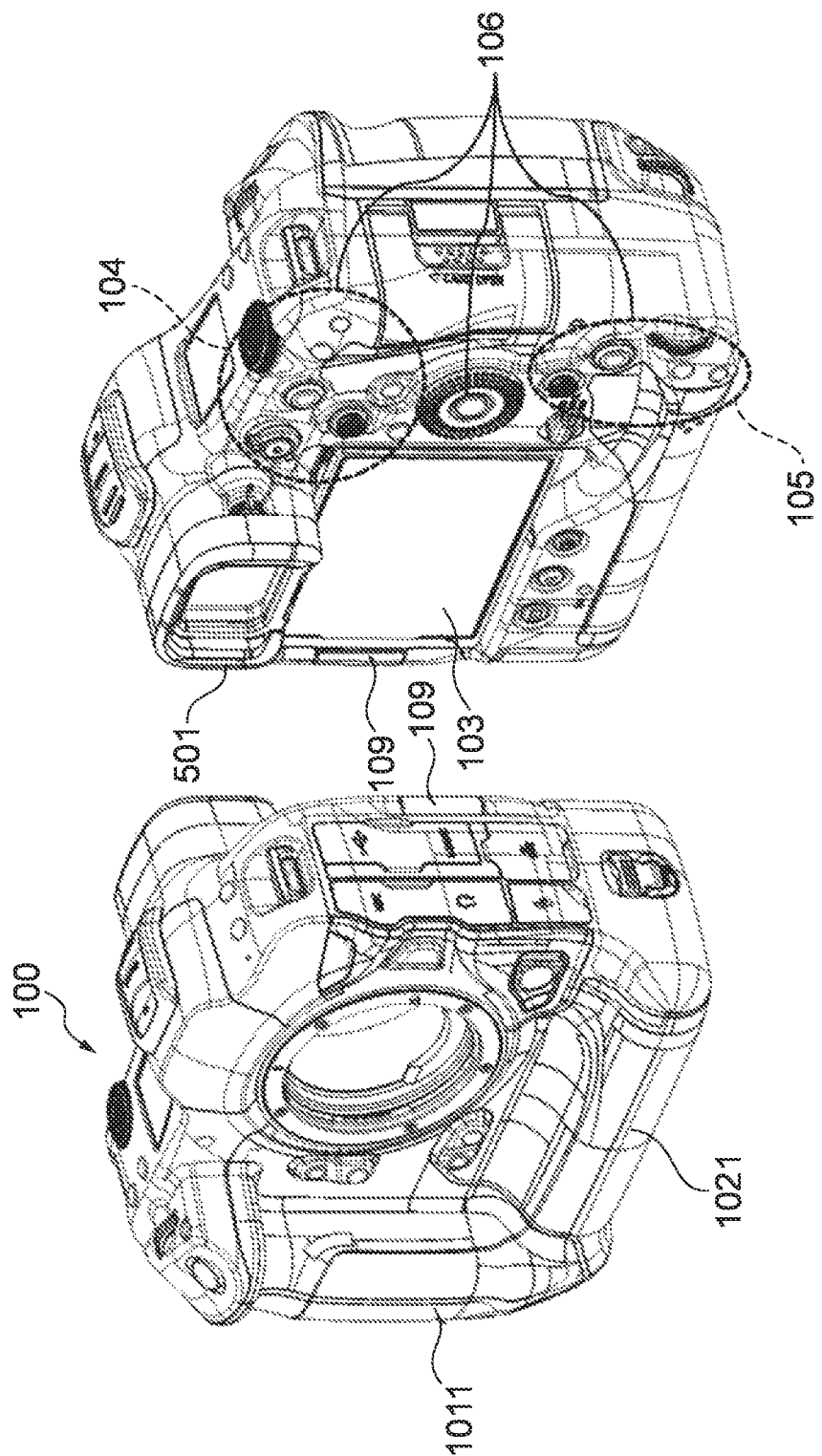
FIG. 1 is an external perspective view of an image pickup apparatus 100.

FIG. 1 is an external perspective view of an image pickup apparatus 100 according to a preferred embodiment of the present invention. As shown in FIG. 1, the front surface side of the image pickup apparatus 100 has a housing shape in which a front surface normal position gripping portion 1011 and a front surface vertical position gripping portion 1021 are formed to be integrated with each other. "The front surface normal position gripping portion 1011" is a gripping portion on the front surface side of the image pickup apparatus 100 when a user (a photographer) normally holds the image pickup apparatus 100. The front surface normal position gripping portion 1011 is provided on the right side of the image pickup apparatus 100 in front view. On the other hand, "the front surface vertical position gripping portion 1021" is a gripping portion on the front surface side of the image pickup apparatus 100 when the user holds the image pickup apparatus 100 in a vertical direction. The front surface vertical position gripping portion 1021 is provided on the lower side of the image pickup apparatus 100. The front surface normal position gripping portion 1011 and the front surface vertical position gripping portion 1021 have a convex shape (or a concave shape) with respect to the subject side, so that the user is able to easily grip the front surface normal position gripping portion 1011 and the front surface vertical position gripping portion 1021. That is, the front surface normal position gripping portion 1011 and the front surface vertical position gripping portion 1021 have at least one of the convex shape and the concave shape with respect to the subject side.

Figure 4:
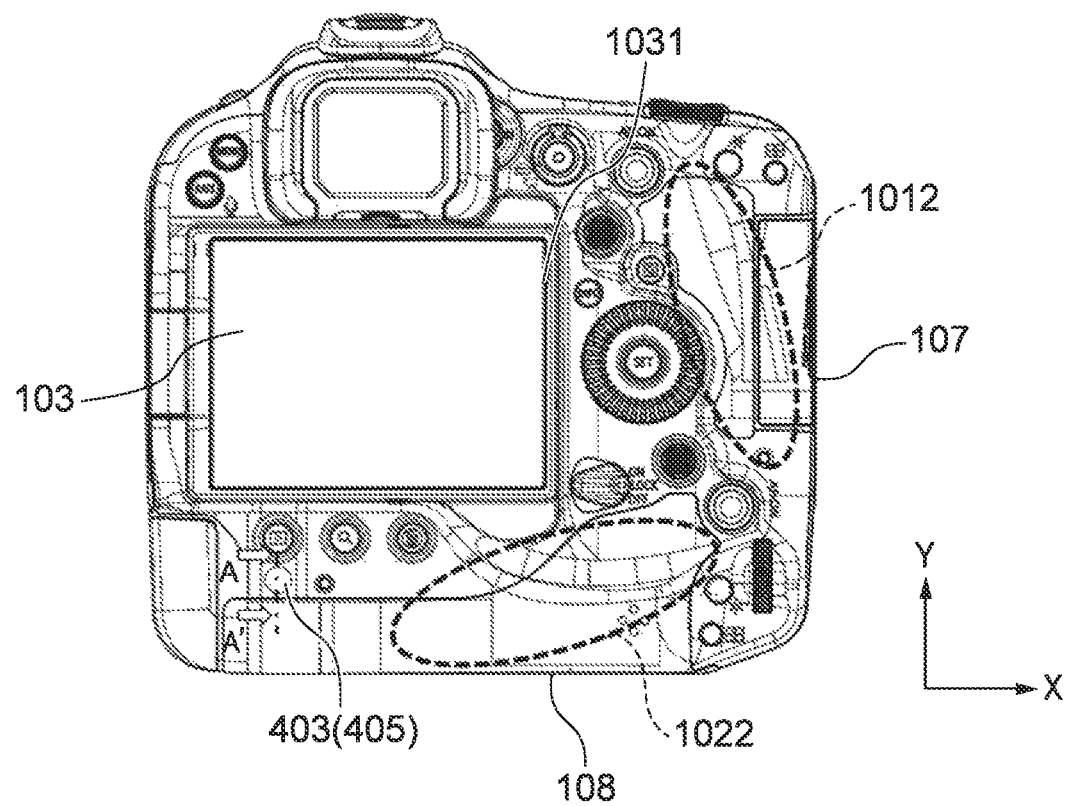
FIG. 4 is a rear view of the image pickup apparatus 100.

In addition, a rear surface normal position operation member 104, which is an operation member when the user grips the front surface normal position gripping portion 1011, is provided at an upper right portion on the rear surface side of the image pickup apparatus 100. Furthermore, as shown in FIG. 4, which will be described below, a rear surface normal position gripping portion 1012 is disposed on the right side on a substantial extension line in a longitudinal direction of a display unit 103, and a rear surface vertical position gripping portion 1022 is disposed on the lower side on a substantial extension line in a right latitudinal direction of the display unit 103. In addition, the front surface normal position gripping portion 1011 corresponds to the rear surface normal position gripping portion 1012, and the front surface vertical position gripping portion 1021 corresponds to the rear surface vertical position gripping portion 1022.

In addition, a rear surface vertical position operation member 105, which is an operation member when the user grips the front surface vertical position gripping portion 1021, is provided at a lower right portion on the rear surface side of the image pickup apparatus 100. That is, the rear surface vertical position operation member 105 is an operation member mainly used "at the time of vertical position photographing". When the rear surface vertical position operation member 105 is used, photographing in which the front surface normal position gripping portion 1011 is gripped can be invalidated by control from a central processing unit (CPU) 301 (even in the case that an operation is performed, the photographing is ignored in terms of control), and vice versa. By executing such control, for example, it is possible to prevent an erroneous operation, which inadvertently touches the rear surface vertical position operation member 105 at the time of rear surface normal position photographing, or the like.

It should be noted that reference numeral 106 is a rear surface physical operation member, which is a general term for operation members that are physically operated by the user, and specifically includes the rear surface normal position operation member 104 and the rear surface vertical position operation member 105. Therefore, the rear surface physical operation member 106 is a physical operation member used when the user performs photographing. In addition, the LCD display unit 103 (also simply referred to as "the display unit") is disposed at the center portion of the rear surface of the image pickup apparatus 100. Furthermore, as shown in FIG. 1, an eye cup 501 that covers the periphery of the user's eye is provided around a finder so that external light does not enter. It should be noted that a vari-angle hinge mechanism 109 shown in FIG. 1 will be described below.

Figure 2:
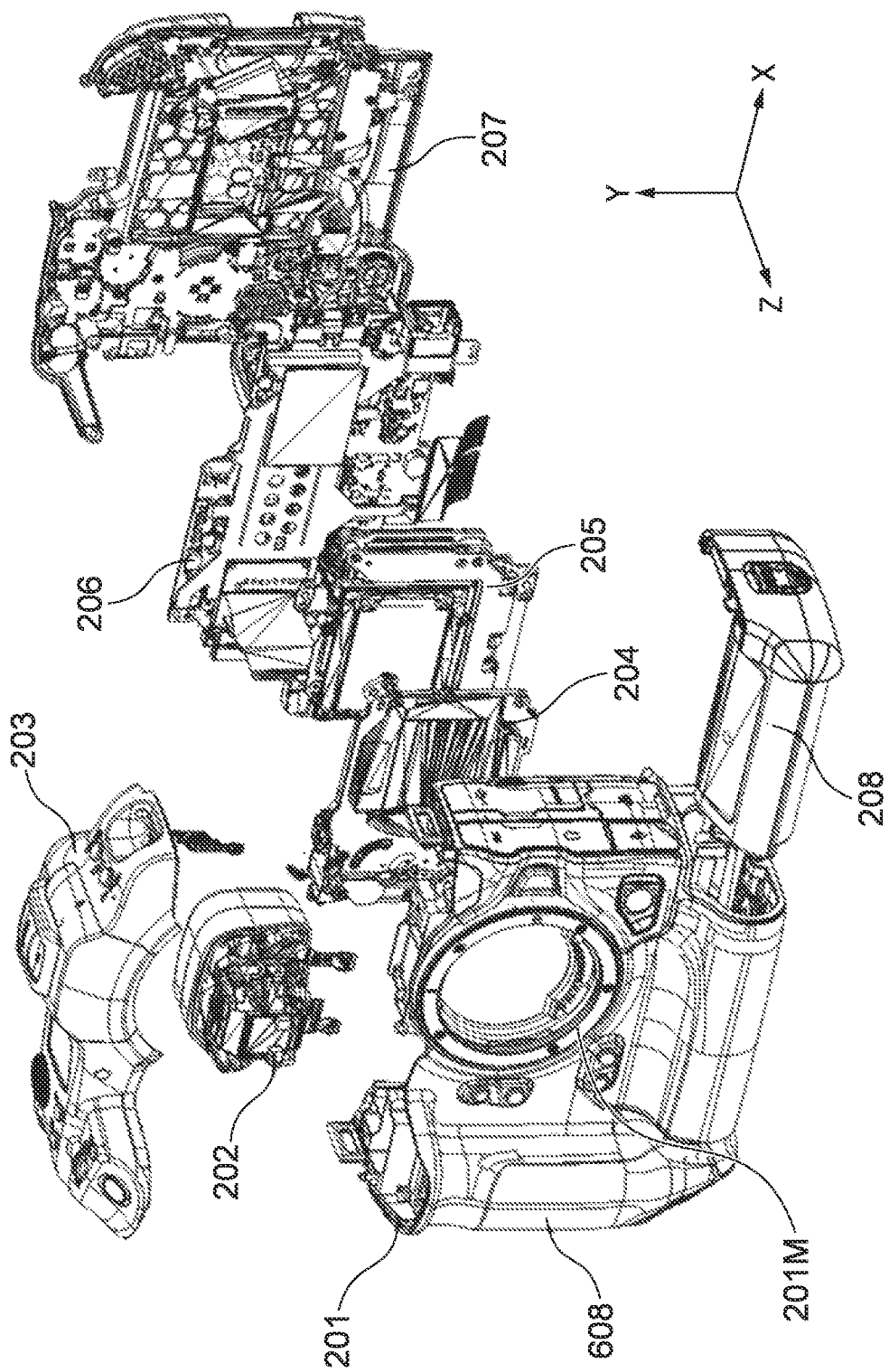
FIG. 2 is an exploded perspective view of the image pickup apparatus 100.

FIG. 2 is an exploded perspective view of the image pickup apparatus 100 according to the preferred embodiment of the present invention. As shown in FIG. 2, an optical axis direction is referred to as "a Z direction", a vertical direction perpendicular to the Z direction is referred to as "a Y direction", and a width direction of the image pickup apparatus 100 perpendicular to the Y direction and the Z direction is referred to as "an X direction". A front cover unit 201 is an external cover of the front surface of the image pickup apparatus 100 and has a function as a chassis that maintains rigidity of the image pickup apparatus 100. In order to maintain the rigidity as the chassis, the front cover unit 201 is mainly formed of a lightweight and tough magnesium alloy or the like. However, in a model where emphasis is placed on low cost, weight reduction, and the like, the front cover unit 201 is not limited to be formed of the lightweight and tough magnesium alloy or the like, and may be formed of, for example, a resin.

In addition, a lens mount 201M for mounting a lens and performing necessary electrical signal communication is assembled to the front cover unit 201. Since the front surface of the front cover unit 201 is an exterior surface, coating for providing aesthetic appearance is applied, and in order to grip the image pickup apparatus 100, a gripping rubber 608 made of nitrile rubber (NBR), polyvinyl chloride (PVC), or the like is attached. It should be noted that respective units to be described below are sequentially assembled so as to be stacked on the rear surface of the front cover unit 201.

An electric view finder unit (an EVF unit) 202 is the finder. The EVF unit 202 includes an ocular lens (not shown), a diopter adjustment mechanism (not shown), an organic electro-luminescence panel (an organic EL panel) 502 to be described below, and an eye-contact detection sensor 506 (see FIGS. 9A and 9B) that detects eye-contact. The EVF unit 202 is connected to a main board unit 206, which will be described below, via a flexible printed circuit board (an FPC).

Figure 9A:
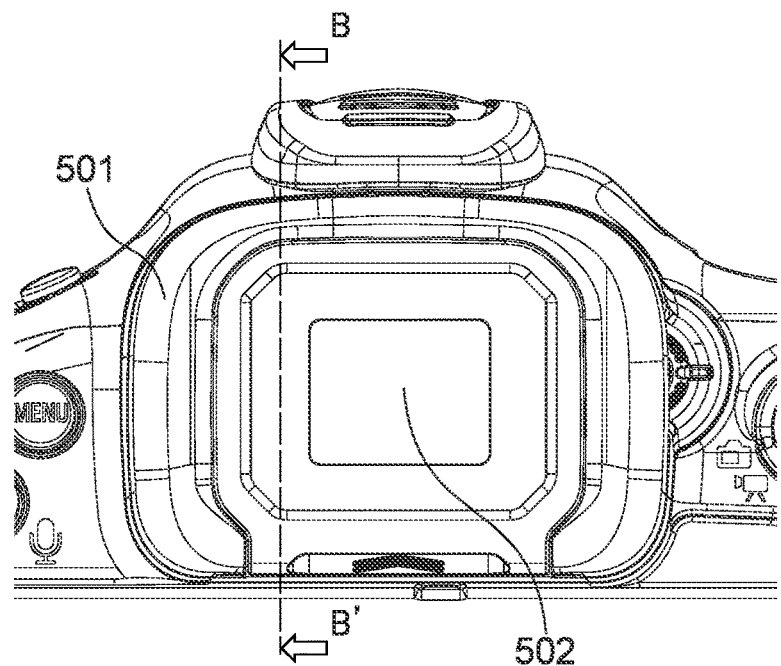
FIG. 9A is a rear view of a finder.
Figure 9B:
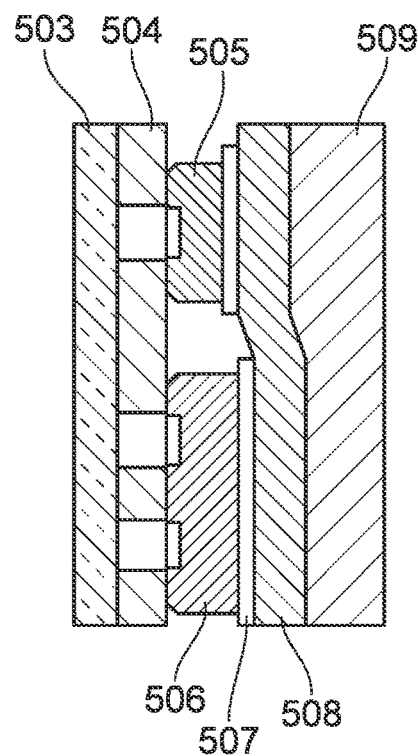
FIG. 9B is a schematic configuration view of a cross section.

The organic EL panel 502 (see FIG. 9A) included in the image pickup apparatus 100 is in "a non-display mode" during normal use. When the user brings his or her face close to the EVF unit 202, infrared light emitted from an infrared light source 506B (see FIG. 10) included in the eye-contact detection sensor 506 shown in FIG. 9B is reflected by the user's face and enters a light receiving element 506A (see FIG. 10). It is configured that the organic EL panel 502 switches to "a display mode" with the incidence of the infrared light on the light receiving element 506A as a trigger. With such a mechanism, the user is able to view information displayed on the organic EL panel 502 through a plurality of optical elements including an eyepiece window 503 (a window member) (see FIG. 9B), which will be described below.

In order to stabilize the holding of the image pickup apparatus 100 in the above-described posture, the eye cup 501 shown in FIG. 1 is disposed around the EVF unit 202. In addition, the eye cup 501 also has a function of improving visibility of the organic EL panel 502 by covering the periphery of the user's eye so that the external light does not enter. Since the eye cup 501 is disposed as described above, by disposing the eye-contact detection sensor 506 (an eye-contact detection unit) inside the eye cup 501, it becomes possible to surely understand that the user is in "an eye-contact state" with respect to the EVF unit 202.

Furthermore, in consideration of the visibility of the organic EL panel 502, the eye-contact detection sensor 506 is preferably disposed outside an angle of view of the organic EL panel 502. Furthermore, in consideration of an uneven shape of a general human face, appearance shapes of the eye cup 501 and the EVF unit 202 are configured to protrude toward the rear surface side of the image pickup apparatus 100.

A release button, an accessory shoe, a liquid crystal panel for displaying a setting state, and the like are disposed in a top cover unit 203 forming the upper surface of the external housing of the image pickup apparatus 100. The top cover unit 203 is an external component (an exterior component), and is formed of a magnesium alloy or the like because strength against drop impact or the like is also required. In addition, although coating of the exterior surface of the top cover unit 203 is applied, in the model where the emphasis is placed on low cost, weight reduction, and the like, the top cover unit 203 is not limited to be formed of the magnesium alloy, and may be formed of a resin or the like.

A shutter unit 204 is incorporated behind the lens mount 201M (in the negative direction of the Z axis), and the shutter unit 204 includes a focal plane shutter unit, etc., and determines an exposure amount. It should be noted that an electronic shutter that determines the exposure amount by forming an electrical slit for each pixel column of an image pickup device, or a configuration that determines the exposure amount by forming a slit by using a combination of an electronic shutter and a mechanical shutter may be employed.

An image pickup unit 205 is incorporated behind the shutter unit 204 (in the negative direction of the Z axis). In order to suppress blurring of a photographed image due to shaking, vibration, or the like of the image pickup apparatus 100, a stabilizer unit that reduces the blurring by swinging the image pickup device by a driving method using electromagnetic force is provided. Furthermore, the image pickup unit 205 includes an image pickup device such as a CCD image sensor or a CMOS image sensor that performs a photoelectric conversion, an A/D conversion circuit that converts analog signals outputted from the image pickup device into digital signals, an image pickup driving circuit that drives the image pickup device, etc.

The main board unit 206 is incorporated behind the image pickup unit 205 (in the negative direction of the Z axis). In the main board unit 206, the central processing unit (CPU) 301, an IC such as a nonvolatile memory 302, connectors for connecting flexible printed circuit boards (FPCs) extending from the respective units, and the like are mounted. The main board unit 206 is a multilayer circuit board for controlling the entire image pickup apparatus 100.

A rear cover unit 207 incorporated on the deepest side when viewed from the front of the image pickup apparatus 100, that is, incorporated on the rearmost side when viewed from the front of the image pickup apparatus 100 is an exterior member of the image pickup apparatus 100. The rear cover unit 207 is configured so that the LCD display unit 103 (also simply referred to as "the display unit 103") including a liquid crystal panel also serves as a touch operation portion 306 capable of performing a touch operation. The LCD display unit 103 is assembled to the image pickup apparatus 100 with the vari-angle hinge mechanism 109 (see FIG. 1) that is openable, closable, and rotatable with respect to the rear cover unit 207. As a result, the display unit 103 becomes able to move horizontally or rotate with respect to the image pickup apparatus 100.

Furthermore, within the rear cover unit 207, various kinds of physical operation members shown in FIG. 1 for selecting a distance measurement point at the time of photographing, changing the setting of the image pickup apparatus 100, and performing reproducing, erasing, or editing of the photographed image are disposed. In addition, a power supply unit 208 capable of housing a battery is provided so as to be able to protrude and retract from the image pickup apparatus 100, and is normally fastened with a fastener (not shown) in a state of being housed in the image pickup apparatus 100. It should be noted that the rear cover unit 207 is an external component (an exterior component), and is formed of a magnesium alloy or the like because the strength against drop impact or the like is required. Although coating of the exterior surface of the rear cover unit 207 is applied, in the model where the emphasis is placed on low cost, weight reduction, and the like, the rear cover unit 207 is not limited to be formed of the magnesium alloy, and may be formed of a resin or the like.

Figure 3:
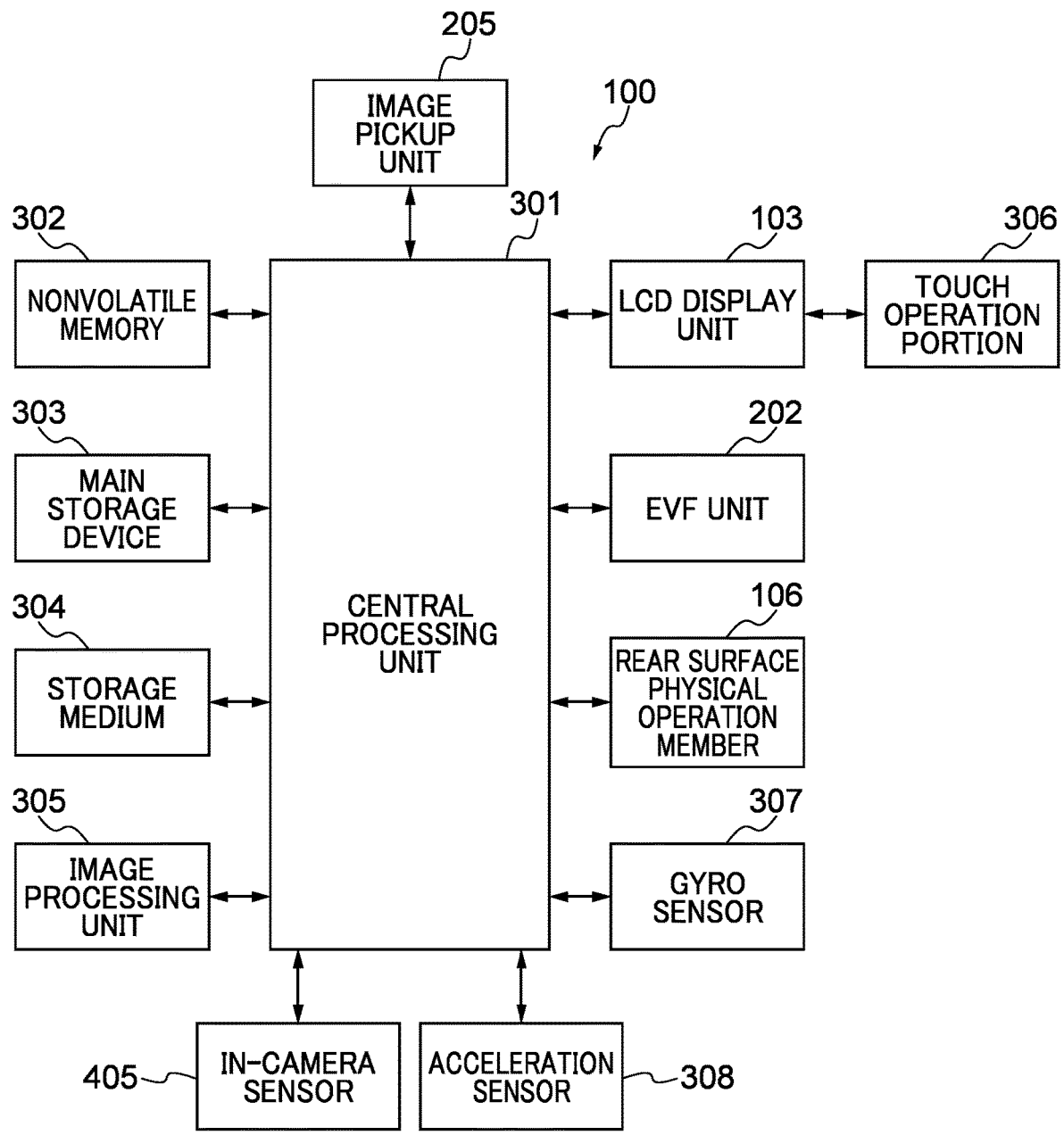
FIG. 3 is a block diagram of an electrical system of the image pickup apparatus 100.

FIG. 3 is a configuration diagram of main electric system components of the image pickup apparatus 100. The image pickup unit 205, the nonvolatile memory 302, a main storage device 303, a storage medium 304, an image processing unit 305, an in-camera sensor 405, and an acceleration sensor 308 are connected to the central processing unit 301 (the CPU, a digital signal processor (DSP), or the like). Furthermore, the LCD display unit 103 (the display unit 103), the EVF unit 202, the rear surface physical operation member 106, and a gyro sensor 307 are also connected to the central processing unit 301. The image pickup unit 205 (see FIG. 1) is used to perform image pickup (photographing) of a subject, and includes, for example, an optical system, the image pickup device, etc.

The central processing unit 301 is a microprocessor such as a CPU or a DSP that executes various types of processing of the image pickup apparatus 100. The nonvolatile memory 302 is a device that stores information in a nonvolatile manner, and is, for example, a read only memory (ROM), a flash memory, or the like. In addition, a program and an operating system (OS) are stored in the nonvolatile memory 302, and the central processing unit 301 executes the program to implement necessary control, various types of processing, etc. The nonvolatile memory 302 also stores information that should be retained even while the power of the image pickup apparatus 100 is turned off such as user setting information, transferred information generated each time image data is transferred, and the like. The main storage device 303 is a device that stores the image data and the like, and is, for example, a random access memory (RAM) or the like. The main storage device 303 is used to temporarily store processing result data of the image processing unit 305.

The storage medium 304 is a device such as a memory card, and is detachable/attachable from/to the image pickup apparatus 100. The storage medium 304 is configured so that a slot-type connector socket thereof is mounted on the main board unit 206 (see FIG. 2). The storage medium 304 is a device detachable/attachable/replaceable by the user via the connector socket of the storage medium 304, and stores the image data photographed by the user. The image processing unit 305 executes necessary image processing in the image pickup apparatus 100 such as a subject recognition processing, an analysis processing of photographed images and moving images, and the like. When a subject is recognized by the image processing performed by the image processing unit 305, subject recognition information is transmitted to the central processing unit 301. As a result, the central processing unit 301 is able to arithmetically define a range of the recognized subject and display a range (a zone), in which the subject has been recognized, on the LCD display unit 103 so that the user can easily understand the range. It should be noted that the central processing unit 301, the nonvolatile memory 302, the main storage device 303, and the image processing unit 305 can be collectively configured as an integrated circuit (an IC) or a microcomputer.

The gyro sensor 307 is a sensor that detects changes in rotation and orientation of an object as an angular velocity by using a Coriolis force, and outputs electrical signals corresponding to the detection to the central processing unit 301. The gyro sensor 307 is mounted on an FPC (not shown), and three gyro sensors are disposed within the top cover unit 203 so that angular velocities around the X axis, the Y axis, and the Z axis can be detected. The gyro sensor 307 is held in a floating state while being sandwiched between elastic members such as sponges so as not to be affected by unnecessary vibration and impact of the image pickup apparatus 100. In accordance with the output of the gyro sensor 307, the central processing unit 301 estimates a motion and a vibration direction of the image pickup apparatus 100. The central processing unit 301 refers to the output of the gyro sensor 307 with respect to the stabilizer unit (not shown), and performs feedback control so as to swing in a direction of canceling the motion, the vibration direction, and the like of the image pickup device, thereby suppressing the blurring of the photographed image.

The acceleration sensor 308 is an inertial sensor that detects a gravity, a motion, a vibration, and an impact, and is a sensor that detects a three-dimensional inertial motion (a translational motion in three orthogonal axial directions). The acceleration sensor 308 may be, for example, a frequency changing type, a piezoelectric type, a piezoresistive type, a capacitive type, or the like, and motions (accelerations) in each of the X axis, the Y axis, and the Z axis directions, a translation direction, a gravity direction, and the like of the image pickup apparatus 100 are detected by output values of the acceleration sensor 308. By combining output values of the gyro sensors 307 and the output values of the acceleration sensor 308, the central processing unit 301 is able to determine the motion of the image pickup apparatus 100.

In addition, the central processing unit 301 receives the digital signals, a control signal, and video signals from the image pickup device, and outputs the video signals to the LCD display unit 103 connected to the central processing unit 301 and the organic EL panel within the EVF unit 202 connected to the central processing unit 301. It should be noted that the LCD display unit 103 also serves as the touch operation portion for the user to perform a touch operation. In addition, the central processing unit 301 develops the video signals as image data, and performs a recording processing of recording on the storage medium 304 and a reading processing of reading out the saved image from the storage medium 304. As described with reference to FIG. 1, the rear surface physical operation member 106 connected to the central processing unit 301 includes the rear surface normal position operation member 104 and the rear surface vertical position operation member 105. Specifically, the rear surface physical operation member 106 includes various kinds of operators or the like having a physical shape.

The in-camera sensor 405 (a user state detection unit) is provided in the rear cover unit 207 shown in FIG. 2 and is a device for photographing the user side of the image pickup apparatus 100. The in-camera sensor 405 photographs the face, torso, or the like of the user, and the central processing unit 301 executes a predetermined calculation by using information obtained by photographing of the in-camera sensor 405 to determine, for example, whether or not the photographer is in "the photographing standby state" and to determine whether or not to shift to "a power saving mode". It should be noted that, in the present embodiment, the in-camera sensor 405 is used to determine whether or not to shift to "the power saving mode". However, use of the information from the in-camera sensor 405 is not limited thereto. For example, the central processing unit 301 may cause to perform an operation of activating the shutter by detecting a specific face expression or gesture of the user by the in-camera sensor 405.

Next, the arrangement of the in-camera sensor 405 within the image pickup apparatus 100 will be described with reference to FIGS. 4 to 8. FIG. 4 is a rear view of the image pickup apparatus 100 as viewed from the rear, in which the LCD display unit 103 having a horizontally long rectangular shape is housed in a state of facing the user. It should be noted that, in FIG. 4, a left-and-right width direction of the image pickup apparatus 100 is referred to as "an X direction", an upward-and-downward direction is referred to as "a Y direction", and the optical axis direction of the optical system is referred to as "a Z direction".

The rear surface normal position gripping portion 1012 is disposed on the substantial extension line on the right side in the longitudinal direction (the X direction) of the LCD display unit 103 having the horizontally long rectangular shape, and the rear surface vertical position gripping portion 1022 is disposed on the substantial extension line on the lower right side in a latitudinal direction (the Y direction) of the LCD display unit 103. It should be noted that the rear surface normal position gripping portion 1012 is a gripping portion on the rear surface side of the image pickup apparatus 100 when the user normally holds the image pickup apparatus 100. In addition, "the rear surface vertical position gripping portion 1022" is a gripping portion on the rear surface side of the image pickup apparatus 100 when the user holds the image pickup apparatus 100 in the vertical direction. The rear surface normal position gripping portion 1012 is connected to the front surface normal position gripping portion 1011 via a right side surface 107 on an extension line in the longitudinal direction of the display unit 103. It should be noted that the front surface normal position gripping portion 1011 is a gripping portion on the front surface side of the image pickup apparatus 100 when the user normally holds the image pickup apparatus 100. On the other hand, the rear surface vertical position gripping portion 1022 is connected to the front surface vertical position gripping portion 1021 via a bottom surface 108 on an extension line in the latitudinal direction of the display unit 103. It should be noted that the front surface vertical position gripping portion 1021 is a gripping portion on the front surface side of the image pickup apparatus 100 when the user holds the image pickup apparatus 100 in the vertical direction.

An in-camera sensor window 403 (a cover member) is provided in front of the in-camera sensor 405, protects the in-camera sensor 405, and is formed of a transparent member. That is, as shown in FIG. 4, the in-camera sensor 405 is disposed on the back side of the in-camera sensor window 403 in the Z direction. The in-camera sensor 405 is disposed at a position that is located on the left side of a right side 1031 of the LCD display unit 103 having the horizontally long rectangular shape and is located away from the rear surface normal position gripping portion 1012 and the rear surface vertical position gripping portion 1022. Specifically, a position at which a hand of the user does not block a detection range of the in-camera sensor 405 is a lower portion within a width of the display unit 103.

The arrangement position of the in-camera sensor 405 is a position at which it is difficult for the user to cover the in-camera sensor 405 with his/her hand even in the case that the user grips the image pickup apparatus 100 in a normal direction (i.e., the user normally grips the image pickup apparatus 100), even in the case that the user grips the image pickup apparatus 100 in the vertical direction, and even in the case that the user operates the rear surface physical operation member 106. As a result, when the user grips and operates the image pickup apparatus 100, an angle of view of the in-camera sensor 405 is less blocked, and the state of the user can be detected more accurately. Therefore, since the image pickup apparatus 100 can be accurately shifted to "the power saving mode", the effect of power saving can be improved.

Figure 5:
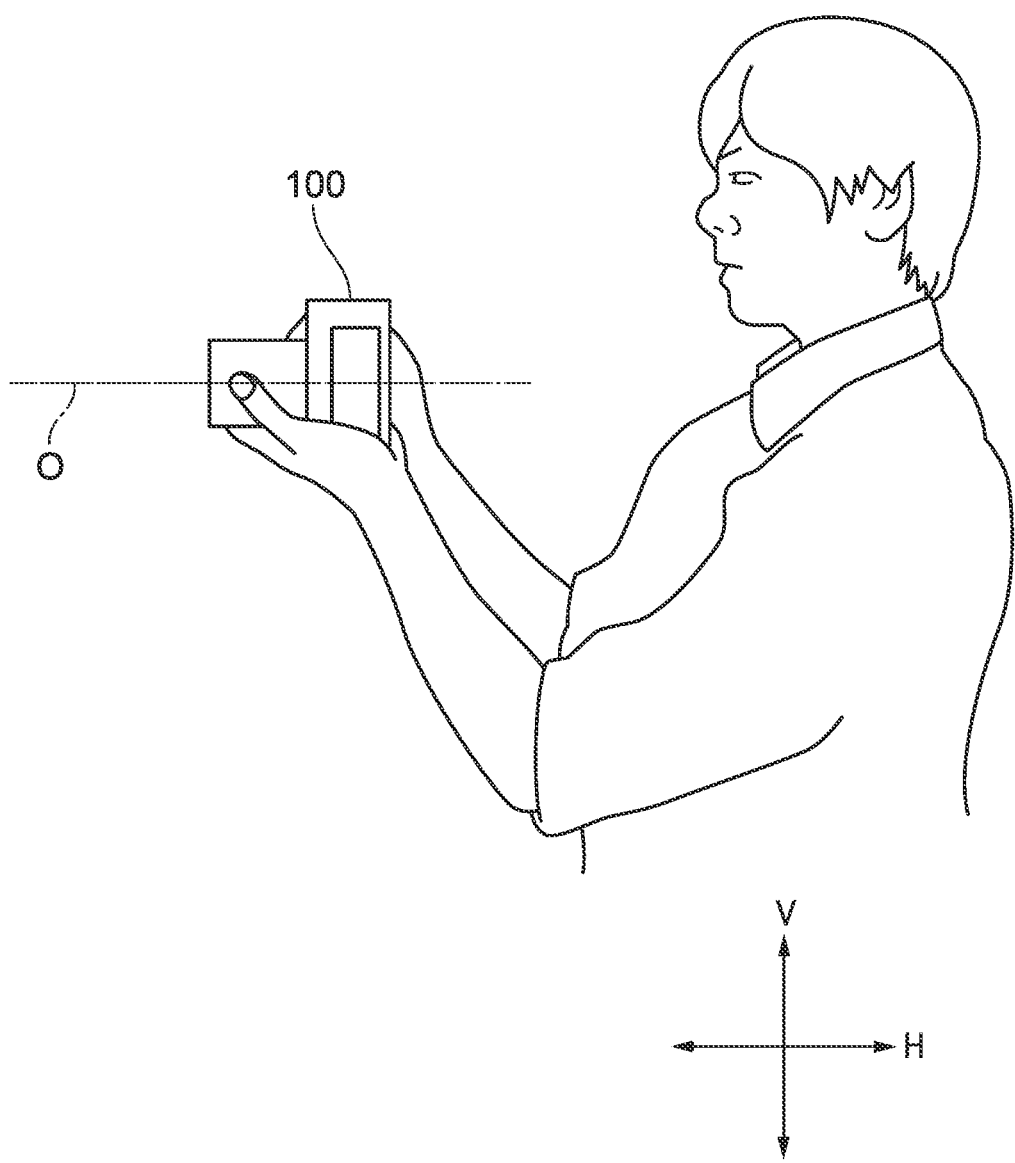
FIG. 5 is an explanatory view that shows a posture when the image pickup apparatus 100 is held.

FIG. 5 is a schematic explanatory view of a posture of the user in photographing in a state in which an optical axis "O" of the image pickup apparatus 100 is substantially horizontal. It should be noted that, in FIG. 5, the horizontal direction as viewed from the user is referred to as "an H direction", and the vertical direction as viewed from the user is referred to as "a V direction". In addition, in the case of performing photographing while confirming the subject displayed on the LCD display unit 103, as shown in FIG. 5, the user may hold the image pickup apparatus 100 not in front of the face but at the height of his/her shoulders or his/her chest. In the image pickup apparatus 100 of the present embodiment, the LCD display unit 103 is provided to be rotatable and movable with respect to the image pickup apparatus 100 by the vari-angle hinge mechanism 109. Therefore, at the time of photographing in the posture shown in FIG. 5, by changing the direction of the LCD display unit 103, a display surface of the LCD display unit 103 is directed to the user's face, and the visibility of the subject displayed on the LCD display unit 103 can be improved.

Figure 6A:
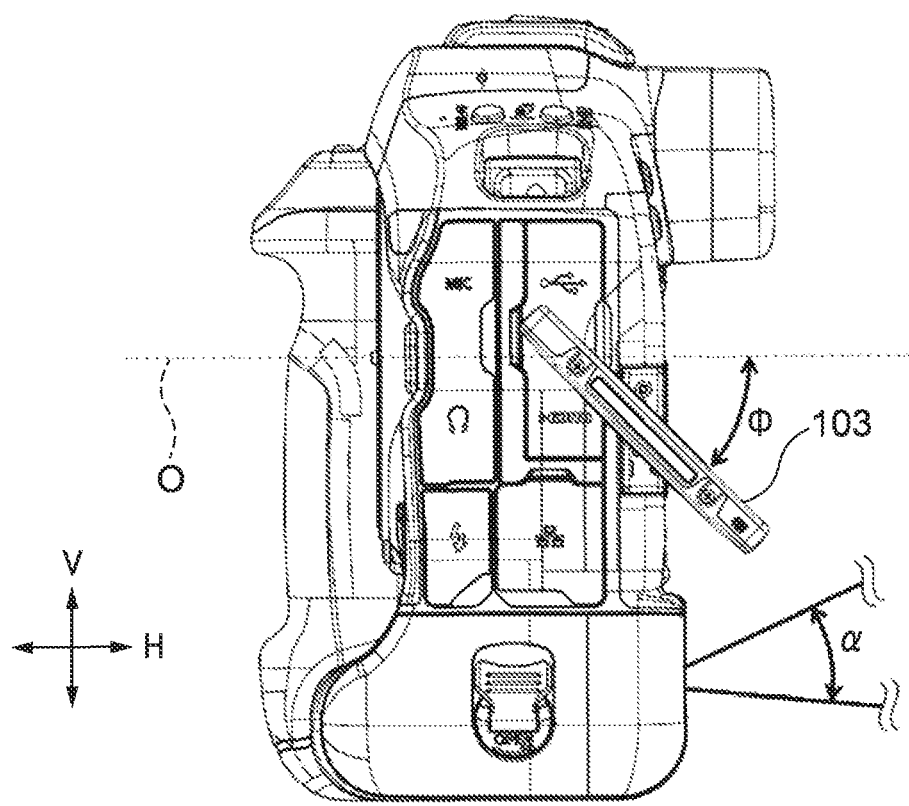
FIG. 6A is a side view of a state in which the image pickup apparatus 100 is normally held.
Figure 6B:
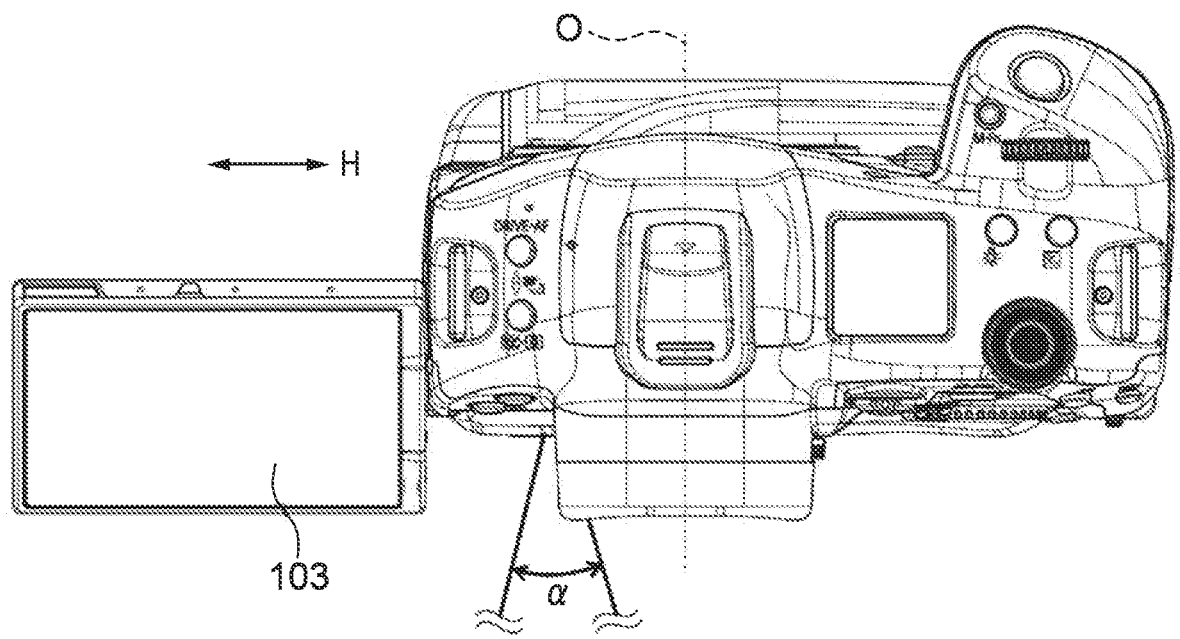
FIG. 6B is a plan view of the state in which the image pickup apparatus 100 is normally held.
Figure 6C:
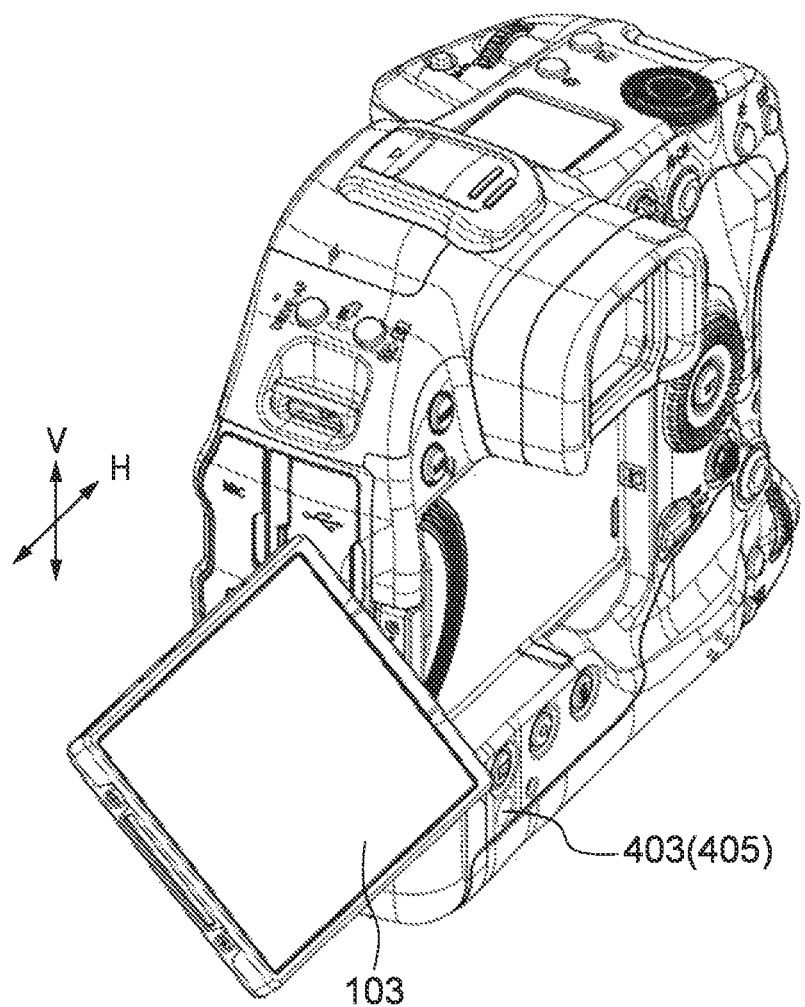
FIG. 6C is a rear perspective view of the state in which the image pickup apparatus 100 is normally held.

FIG. 6A is a side view of the state in which the image pickup apparatus 100 is normally held. FIG. 6B is a plan view of the state in which the image pickup apparatus 100 is normally held. FIG. 6C is a rear perspective view of the state in which the image pickup apparatus 100 is normally held. For example, in the case that the image pickup apparatus 100 is held in a state of holding the front surface normal position gripping portion 1011 and the rear surface normal position gripping portion 1012, as shown in a side view seen from the left side of FIG. 6A, a rotation axis (a first rotation axis) parallel to the longitudinal direction of the LCD display unit 103 is set as a rotation center. In addition, the LCD display unit 103 can be rotated by an angle "φ" relative to the optical axis "O" to take a posture in which the display surface of the LCD display unit 103 faces upwards. FIG. 6B is a plan view of the image pickup apparatus 100 as viewed from the top surface in this state, and FIG. 6C is a rear perspective view of the image pickup apparatus 100 as viewed from the top surface in this state. Furthermore, in FIG. 6A, the angle of view of the in-camera sensor 405 is indicated by "α".

The angle of view "α" of the in-camera sensor 405 spreads in a substantially conical shape, and an object present within the angle of view "α" can be photographed. The angle of view "α" can be changed by selecting the type of the in-camera sensor 405. Further, the spreading of the angle of view "α" does not necessarily have to be the conical shape, and may be, for example, a substantially quadrangular pyramid shape. As shown in FIG. 6A, the LCD display unit 103 having the horizontally long rectangular shape is rotated around the rotation axis (the first rotation axis), which is parallel to the longitudinal direction of the LCD display unit 103, by the angle "φ" relative to the optical axis O. As a result, the in-camera sensor 405 is disposed so as not to block the angle of view "α" of the in-camera sensor 405 even in the case that the display surface of the LCD display unit 103 takes the posture facing upwards.

Figure 7A:
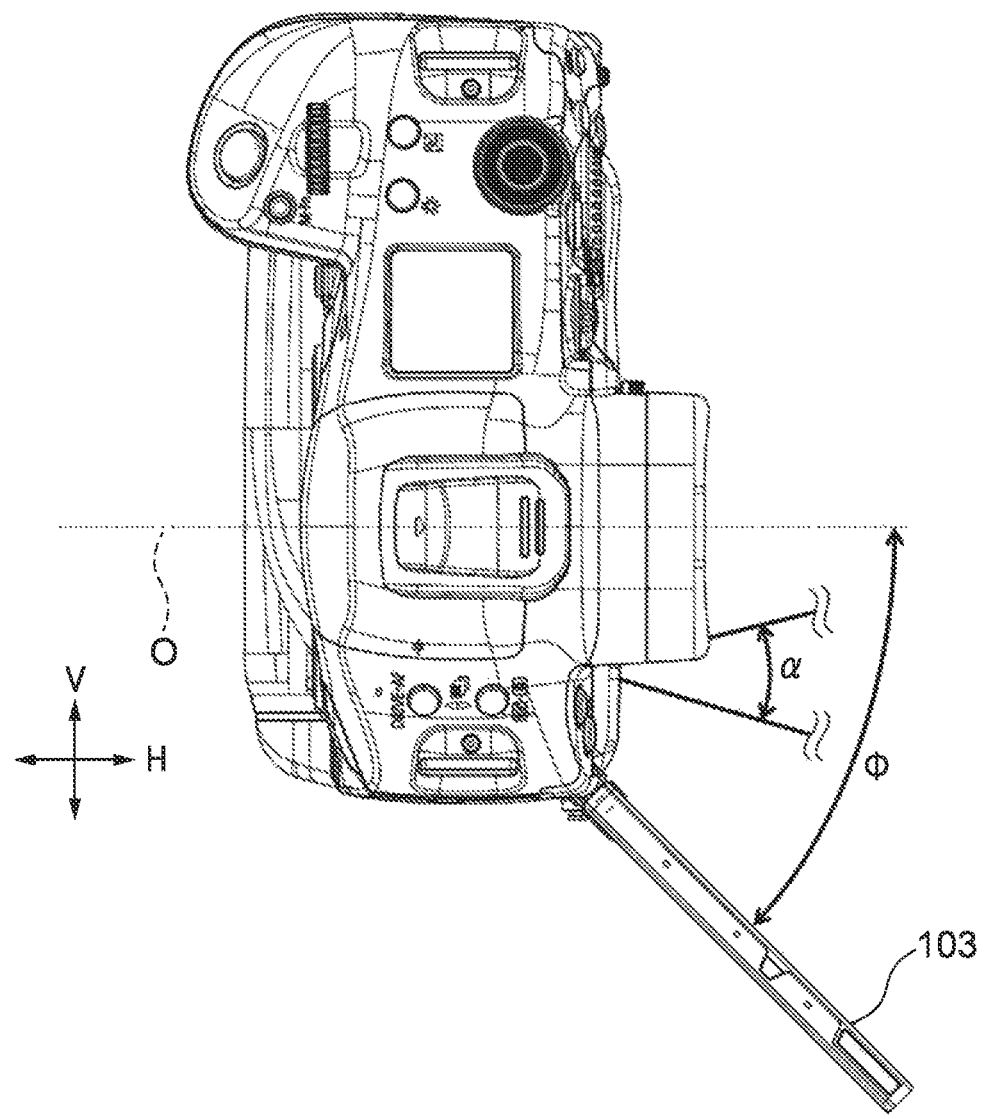
FIG. 7A is a side view of a state in which the image pickup apparatus 100 is held in a vertical direction.
Figure 7B:
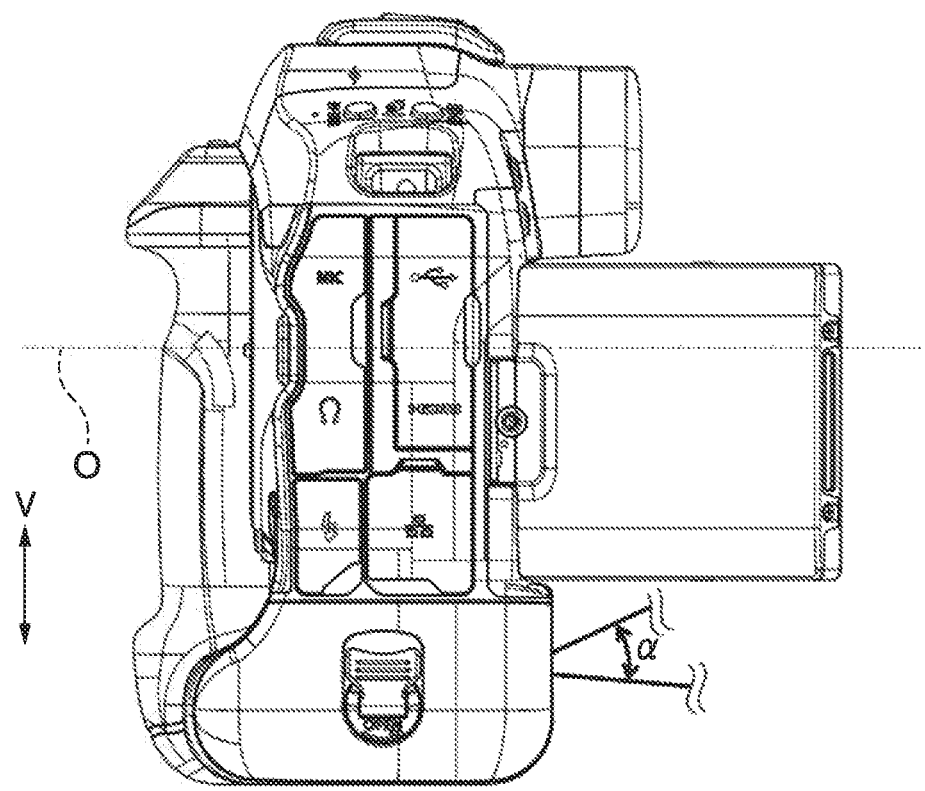
FIG. 7B is a plan view of the state in which the image pickup apparatus 100 is held in the vertical direction.
Figure 7C:
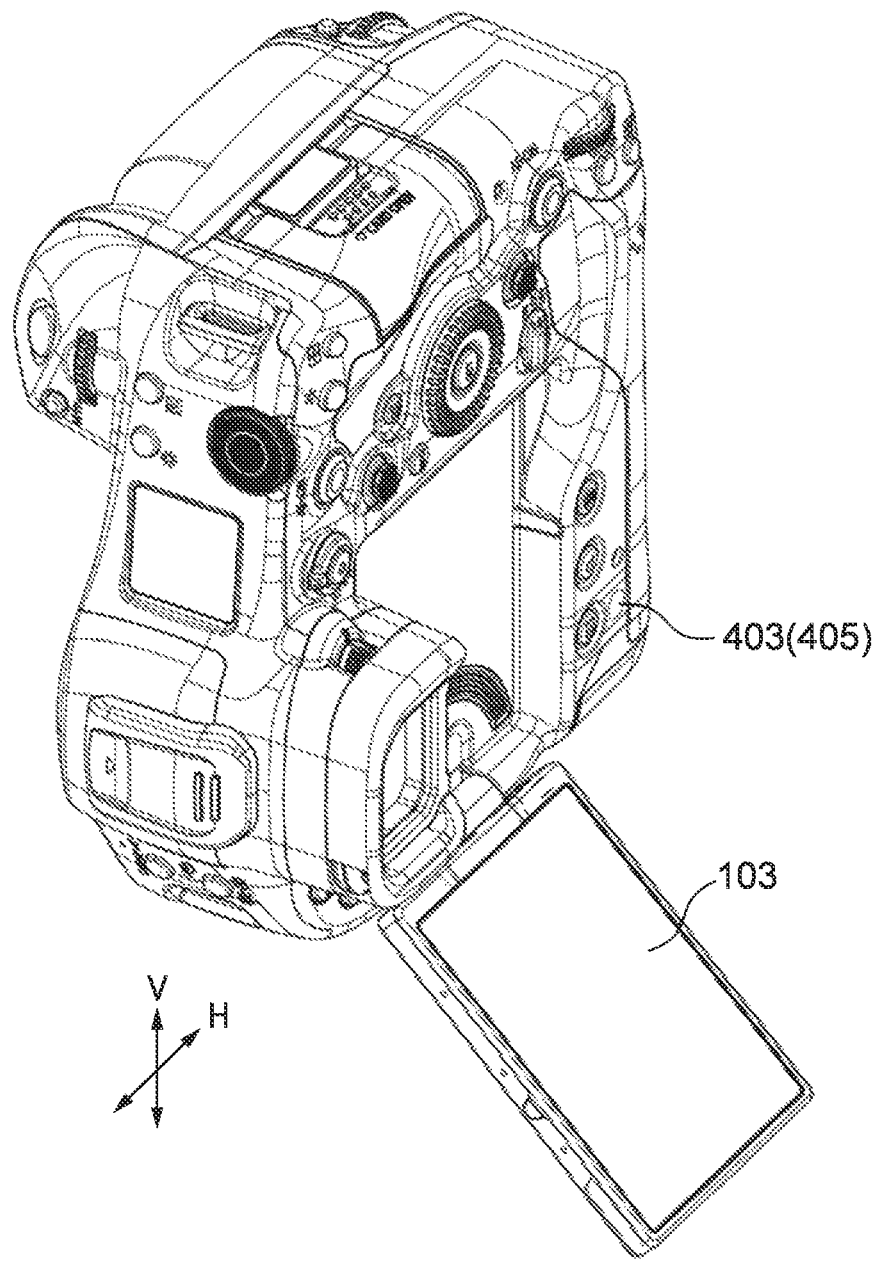
FIG. 7C is a rear perspective view of the state in which the image pickup apparatus 100 is held in the vertical direction.

FIG. 7A is a side view of the state in which the image pickup apparatus 100 is held in the vertical direction. FIG. 7B is a plan view of the state in which the image pickup apparatus 100 is held in the vertical direction. FIG. 7C is a rear perspective view of the state in which the image pickup apparatus 100 is held in the vertical direction. In addition, for example, in a case where the front surface vertical position gripping portion 1021 and the rear surface vertical position gripping portion 1022 are gripped and held, as shown in FIG. 7A (a side view seen from the left), a rotation axis (a second rotation axis) parallel to the latitudinal direction of the LCD display unit 103 having the horizontally long rectangular shape is set as a rotation center. In addition, the LCD display unit 103 can be rotated by the angle "φ" relative to the optical axis "O" to take the posture in which the display surface of the LCD display unit 103 faces upwards. FIG. 7B is a plan view of the image pickup apparatus 100 in this state, and FIG. 7C is a rear perspective view of the image pickup apparatus 100 in this state. Furthermore, in FIGS. 7A and 7B, the angle of view of the in-camera sensor 405 is indicated by "α". As shown in FIGS. 7A and 7B, the LCD display unit 103 having the horizontally long rectangular shape is rotated around the rotation axis (the second rotation axis), which is parallel to the latitudinal direction of the LCD display unit 103, as the rotation center by the angle "φ" relative to the optical axis O. As a result, the in-camera sensor 405 is disposed so as not to block the angle of view "α" of the in-camera sensor 405 even when the display surface of the LCD display unit 103 takes the posture facing upwards.

As a result, when the user turns (rotates) the LCD display unit 103 with respect to the image pickup apparatus 100, the angle of view of the in-camera sensor 405 is less blocked, and the state of the user can be detected more accurately. Therefore, shifting to "the power saving mode" of the image pickup apparatus 100 can be accurately performed, and the effect of power saving can be further enhanced. It should be noted that, as shown in FIG. 5, in the case that the direction of the LCD display unit 103 is changed and the display surface thereof is directed to the user's face when photographing is performed in the state in which the optical axis "O" of the image pickup apparatus 100 is substantially horizontal, it is assumed that the angle "φ" in FIGS. 6A and 7A is "45 degrees" or more. Therefore, the in-camera sensor 405 is disposed so as not to block the angle of view "α" of the in-camera sensor 405 even in the case that "φ" is "45 degrees" or more.

Figure 8:
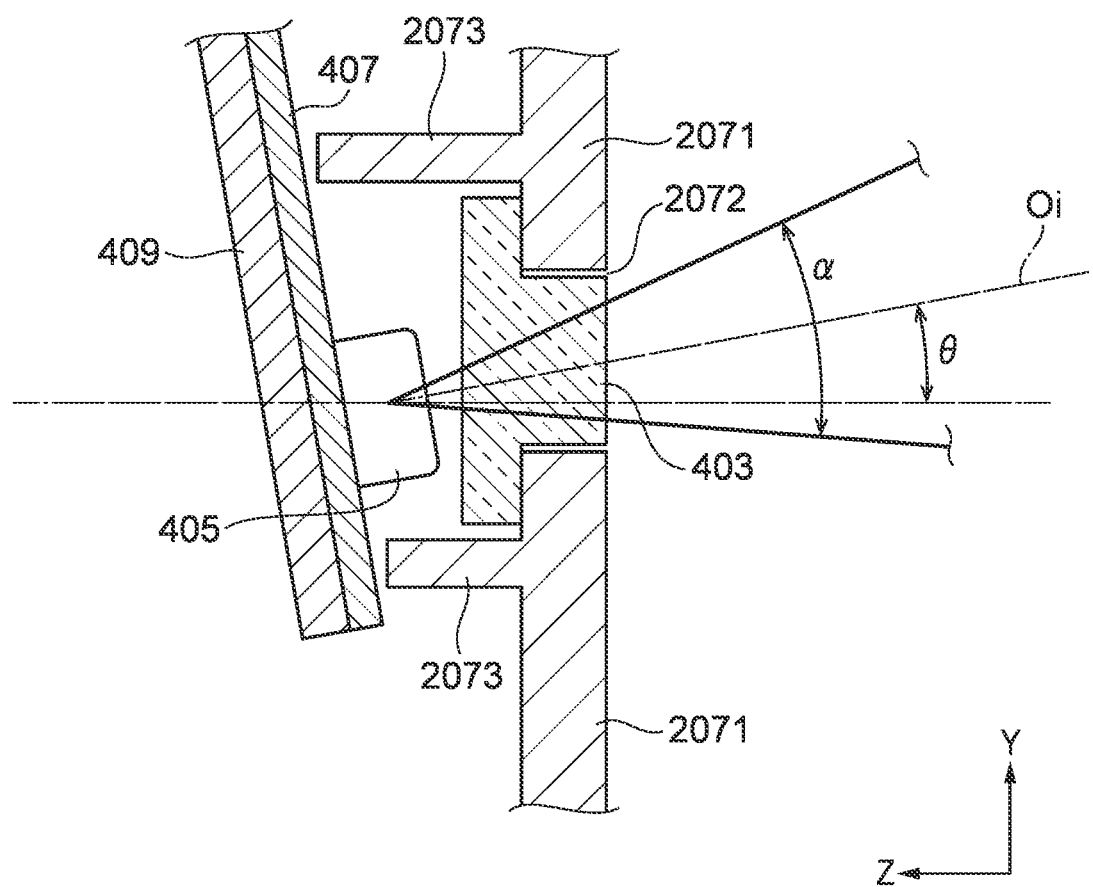
FIG. 8 is a schematic cross-sectional view taken along line A-A' in FIG. 4.

FIG. 8 is a schematic view of a cross section taken along line A-A' shown in FIG. 4. In FIG. 8. the angle of view of the in-camera sensor 405 is indicated by "α". The in-camera sensor 405 is fixed on a flexible printed circuit board 407 fixed to the surface of a sheet metal 409 (a holding member). As described above, the in-camera sensor window 403 made of the transparent member is provided on the front side of the in-camera sensor 405. The in-camera sensor window 403 is provided so as to close an in-camera sensor opening portion 2072 formed in a rear cover 2071. Furthermore, a standing wall (a standing wall shape) 2073 is erected from the rear cover 2071 so as to sandwich the in-camera sensor window 403, and is configured so that the angle of view "α" of the in-camera sensor 405 is not blocked.

By disposing the in-camera sensor window 403 on the front side of the in-camera sensor 405, it is possible to prevent inadvertent contact with the in-camera sensor 405 and inadvertent damage to the in-camera sensor 405 when the image pickup apparatus 100 is used. Furthermore, the in-camera sensor 405 is mounted in a state of being inclined at a predetermined angle "θ" with respect to the Z direction in the image pickup apparatus 100. That is, an optical axis "Oi" of the angle of view "α" of the in-camera sensor 405 is in the state of being inclined at the angle "θ" with respect to the Z direction. It should be noted that the Y axis and the Z axis are taken in the same manner as in FIG. 4.

In the present embodiment, as shown in FIG. 4, the in-camera sensor 405 is disposed in the vicinity of the bottom surface of the image pickup apparatus 100. Furthermore, as shown in FIG. 5, the position of the optical axis "O" of the image pickup apparatus 100 does not necessarily coincide with the position of the user's face, and in the case of not being inclined by the angle "θ", it is conceivable that the optical axis "Oi" of the angle of view "α" becomes a position away from the user's face. Therefore, by inclining the optical axis "Oi" of the angle of view "α" by the angle "θ", the possibility that the user's face enters the angle of view "α" is enhanced, and the effect of power saving of the image pickup apparatus 100 can be further enhanced by more accurately detecting the state of the user.

It should be noted that, in the present embodiment, the in-camera sensor 405 is inclined in only one axis direction with respect to the Z direction, but is not limited thereto, and may be inclined in two axis directions. Furthermore, an in-camera sensor driving mechanism (not shown) may be configured to change the drive of the inclination angle "θ" as appropriate based on the posture of the image pickup apparatus 100 detected by the gyro sensor 307, the acceleration sensor 308, and a vari-angle state detection unit (not shown) and the state of the vari-angle hinge mechanism 109. That is, the in-camera sensor driving mechanism (a driving mechanism) that drives the in-camera sensor 405 includes an apparatus state detection unit (including the vari-angle hinge mechanism 109, the gyro sensor 307, and the acceleration sensor 308) that detects a state of the image pickup apparatus 100, and the in-camera sensor 405 can also be driven by the driving mechanism based on information indicating the detected state of the image pickup apparatus 100.

In addition, the in-camera sensor window 403 is fixed to the rear cover 2071 with an adhesive. Furthermore, the in-camera sensor 405 is mounted on the flexible printed circuit board (FPC) 407, and is held by being attached to the sheet metal 409 with a double-sided tape. The sheet metal 409 is screwed to the rear cover 2071 with screws (not shown). Thus, the in-camera sensor 405 is configured as the rear cover unit 207. As a result, since the configuration is such that there is little variance in the position of the rear cover 2071 with respect to the in-camera sensor 405, it is possible to prevent the in-camera sensor opening portion 2072 and the in-camera sensor window 403 from becoming larger than necessary.

Further, the standing wall 2073 is erected around the entire periphery of the in-camera sensor window 403 on the apparatus inner side of the rear cover 2071. Therefore, the entire periphery of the in-camera sensor 405 is covered with the standing wall 2073. In other words, the standing wall 2073 and the sheet metal 409 having conductivity provide a configuration in which the periphery of the in-camera sensor 405 is covered with a conductive member. With this configuration, it becomes possible to suppress deterioration in electromagnetic wave shielding performance.

The following configuration of the image pickup apparatus 100 is provided by the above description. First, the image pickup apparatus 100, which includes the housing and the display unit 103 having the horizontally long rectangular shape disposed on the rear surface of the housing, includes the in-camera sensor 405 (the user state detection unit) that detects the state of the user. In addition, the image pickup apparatus 100 includes the rear surface normal position gripping portion 1012 (a rear surface gripping portion) disposed on the right side on the substantial extension line in the longitudinal direction of the display unit 103.

In addition, the image pickup apparatus 100 includes the front surface normal position gripping portion 1011 (a front surface gripping portion), which is disposed on the front surface of the housing of the image pickup apparatus 100 and corresponds to the rear surface normal position gripping portion 1012 (the rear surface gripping portion). In addition, the rear surface normal position gripping portion 1012 (the rear surface gripping portion) is connected to the front surface normal position gripping portion 1011 (the front surface gripping portion) via a housing side surface (the right side surface 107) on the extension line in the longitudinal direction of the display unit 103. In addition, the front surface normal position gripping portion 1011 has at least one of the convex shape and the concave shape. In addition, the in-camera sensor 405 (the user state detection unit) is disposed at a position which is closer to the left side of the display unit 103 than to the right side of the display unit 103 and prevents the detection range of the in-camera sensor 405 from being blocked by the hand of the user when the user holds and operates the image pickup apparatus.

Furthermore, the aspect of the image pickup apparatus 100 being held in the vertical direction is described as follows. The image pickup apparatus 100 further includes the rear surface vertical position gripping portion 1022 (a second rear surface gripping portion) disposed on the lower side on the substantial extension line in the right latitudinal direction of the display unit 103, and the front surface vertical position gripping portion 1021 (a second front surface gripping portion), which is disposed on the front surface of the housing and corresponds to the rear surface vertical position gripping portion 1022 (the second rear surface gripping portion). In addition, the rear surface vertical position gripping portion 1022 (the second rear surface gripping portion) is configured to be connected to the front surface vertical position gripping portion 1021 (the second front surface gripping portion) via a housing bottom surface (the bottom surface 108) on the extension line in the latitudinal direction of the display unit 103. In addition, the front surface vertical position gripping portion 1021 (the second front surface gripping portion) has at least one of the convex shape and the concave shape.

Furthermore, in the image pickup apparatus 100 according to another aspect, the display unit 103 includes the vari-angle hinge mechanism 109 (a hinge member) capable of holding the display unit 103 in a state in which the display unit 103 is rotated with respect to the housing around at least two rotation axes substantially perpendicular to each other as rotation centers and is inclined. In addition, the in-camera sensor 405 is disposed, in the case that the display unit 103 is rotated by a predetermined angle or more with respect to the first rotation axis parallel to the longitudinal direction of the display unit 103 so that the display unit 103 faces toward a top surface direction of the housing, at a position preventing the display unit 103 from blocking the detection range of the in-camera sensor 405.

Moreover, in the image pickup apparatus 100 according to another aspect, the display unit 103 includes the vari-angle hinge mechanism 109 (the hinge member) having the above-described function. In addition, the in-camera sensor 405 is disposed, in the case that the display unit 103 is rotated by a predetermined angle or more with respect to the second rotation axis parallel to the latitudinal direction of the display unit 103 so that the display unit 103 faces toward a right side surface direction in a front view of the housing, at a position preventing the display unit 103 from blocking the detection range of the in-camera sensor 405.

Figure 10:
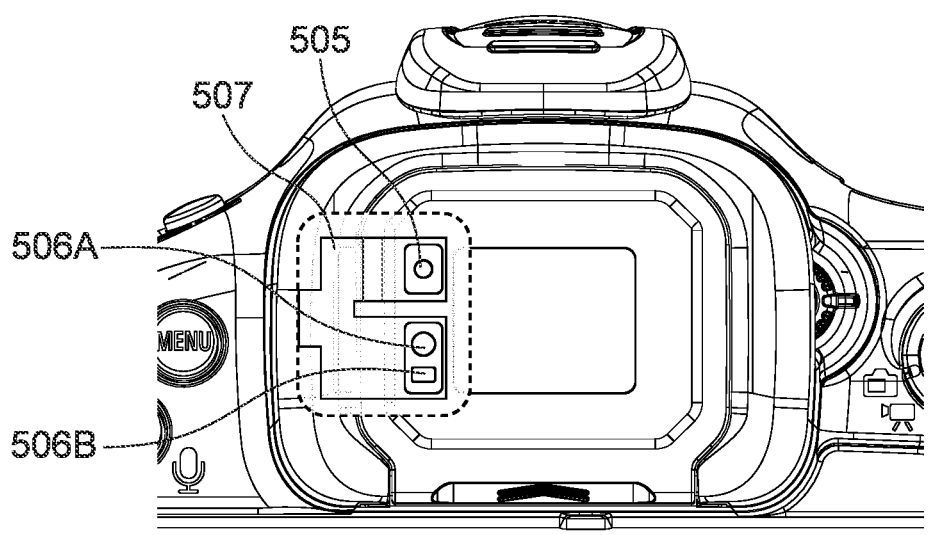
FIG. 10 is a rear view of the finder.

A second embodiment of the present invention will be described. Next, a peripheral configuration of the EVF unit 202 (see FIG. 2) of an image pickup apparatus 100 according to the second embodiment of the present invention will be described with reference to FIGS. 9A, 9B, and 10. FIG. 9A is a rear enlarged view showing an appearance around the EVF unit 202 of the image pickup apparatus 100 according to the second embodiment of the present invention. FIG. 9B is a schematic explanatory view of a cross section of the image pickup apparatus 100 according to the second embodiment of the present invention when the image pickup apparatus 100 is taken along line B-B' shown in FIG. 9A. FIG. 10 is a schematic configuration view showing the shape and the arrangement of a flexible printed circuit board (an FPC) 507 including an in-camera sensor 505 (in the first embodiment, the in-camera sensor is indicated by reference numeral 405) and the eye-contact detection sensor 506 of the image pickup apparatus 100 according to the second embodiment of the present invention. Within a dotted line frame shown in FIG. 10, parts other than the FPC 507 and its mounted components are shown in a transparent manner.

In the second embodiment of the present invention, the in-camera sensor 505 is disposed outside the angle of view of the organic EL panel 502 and inside the eye cup 501. As a result, the in-camera sensor 505 is disposed on a rear surface side protruding portion (as shown in FIG. 1, a left side upper portion of the rear surface) of the image pickup apparatus 100. By disposing the in-camera sensor 505 at such a position, it is possible to reduce a frequency at which other external components (other exterior components), a user's hand operating the image pickup apparatus 100, or the like enters an angle of view of the in-camera sensor 505 as much as possible. Since this layout hardly competes with layouts of other operation members and the like, this layout can be widely applied to the image pickup apparatus 100 including the EVF unit 202, and the above-described effects can be obtained.

In addition, as shown in the cross-sectional view of FIG. 9B, the FPC 507 is provided outside a holding member 509 via a cushion member 508 (an elastic member). In addition, the in-camera sensor 505 and the eye-contact detection sensor 506 are disposed at corresponding positions on the FPC 507, respectively. In addition, the eyepiece window 503 is provided outside the in-camera sensor 505 and the eye-contact detection sensor 506 via a frame body 504.

In order to prevent the infrared light emitted from the infrared light source 506B (see FIG. 10) from being reflected on the side surface within the housing of the image pickup apparatus 100 and erroneously entering the light receiving element 506A (see FIG. 10), the eye-contact detection sensor 506 is provided to abut on the frame body 504. In order to suppress changes in a relative angle and a position with respect to the image pickup apparatus 100 due to the influence of an external impact or the like, the in-camera sensor 505 is also disposed so as to abut on the frame body 504. The in-camera sensor 505 and the eye-contact detection sensor 506 are biased by the cushion member 508 bonded to the holding member 509, thereby being sandwiched between the cushion member 508 and the frame body 504 while maintaining an abutting relationship.

In addition, by disposing the in-camera sensor 505 in the vicinity of the eye-contact detection sensor 506, it becomes possible to use an appearance window component, the frame body 504, the cushion member 508, the holding member 509, etc., which are originally necessary for each sensor, in common. In the second embodiment of the present invention, the eyepiece window 503 of the EVF unit 202 and the above-mentioned appearance window component are configured to be one common part, but they may be separate parts.

In addition, it is also possible to mount the in-camera sensor 505 on the same FPC 507 as the eye-contact detection sensor 506. However, there is a concern that the abutting relationship with the frame body 504 cannot be maintained due to dimensional variances of the respective sensors. Therefore, in the case that the in-camera sensor 505 is provided on the same FPC 507 as the eye-contact detection sensor 506, or in the case that the in-camera sensor 505 and the eye-contact detection sensor 506 are mounted at positions close to each other, it is preferable to provide a slit between the two sensors, that is, between the in-camera sensor 505 and the eye-contact detection sensor 506.

Furthermore, in the case that the in-camera sensor 505 is mounted in the vicinity of the eye-contact detection sensor 506, it is necessary to consider the influence of the infrared light emitted from the infrared light source 506B on an obtained image of the in-camera sensor 505. Therefore, it is preferable that the in-camera sensor 505 and the infrared light source 506B are disposed as far as possible. As a result, as shown in FIG. 10, in the second embodiment of the present invention, the in-camera sensor 505 is disposed on the light receiving element 506A side of the eye-contact detection sensor 506.

As described above, according to the second embodiment of the present invention, the in-camera sensor 505 is disposed within the EVF unit 202 provided on the rear surface side protruding portion (the left side upper portion of the rear surface) of the image pickup apparatus 100. Therefore, as compared with the first embodiment, the possibility that the hand of the user or the LCD display unit 103 enters the angle of view of the in-camera sensor 505 is reduced. As a result, the state of the user can be more accurately detected, and the image pickup apparatus 100 can appropriately shift to "the power saving mode", thereby it becomes possible to further enhance the effect of power saving.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., ASIC) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-028405, filed on Feb. 27, 2023, which is hereby incorporated by reference herein in its entirety.

What is claimed is:

1. An image pickup apparatus including a housing and a display unit, which has a horizontally long rectangular shape and is disposed on a rear surface of the housing, the image pickup apparatus comprising:
    a user state detection unit configured to detect a state of a user;
    a rear surface gripping portion disposed on a right side on a substantial extension line in a longitudinal direction of the display unit; and
    a front surface gripping portion, which is disposed on a front surface of the housing and corresponds to the rear surface gripping portion, and
    wherein the rear surface gripping portion is configured to be connected to the front surface gripping portion via a housing side surface on an extension line in the longitudinal direction of the display unit,
    the front surface gripping portion has at least one of a convex shape and a concave shape, and
    the user state detection unit is disposed at a position, which is closer to a left side of the display unit than to a right side of the display unit and prevents a detection range of the user state detection unit from being blocked by a hand of the user when the user grips and operates the image pickup apparatus.

2. The image pickup apparatus according to claim 1, further comprising:
    a second rear surface gripping portion disposed on a lower side on a substantial extension line in a right latitudinal direction of the display unit; and
    a second front surface gripping portion, which is disposed on the front surface of the housing and corresponds to the second rear surface gripping portion, and
    wherein the second rear surface gripping portion is configured to be connected to the second front surface gripping portion via a housing bottom surface on an extension line in a latitudinal direction of the display unit, and
    the second front surface gripping portion has at least one of a convex shape and a concave shape.

3. The image pickup apparatus according to claim 1, wherein
    the position preventing the detection range of the user state detection unit from being blocked is a lower left portion within a width of the display unit.

4. The image pickup apparatus according to claim 1, wherein
    the user state detection unit is an in-camera that photographs the user, and information photographed by the in-camera is displayed on the display unit.

5. The image pickup apparatus according to claim 1, wherein
    the display unit includes a hinge member capable of holding the display unit in a state in which the display unit is rotated with respect to the housing around at least two rotation axes substantially perpendicular to each other as rotation centers and is inclined, and
    the user state detection unit is disposed, in a case that the display unit is rotated by a predetermined angle or more with respect to a first rotation axis parallel to the longitudinal direction of the display unit so that the display unit faces toward a top surface direction of the housing, at a position preventing the display unit from blocking the detection range of the user state detection unit.

6. The image pickup apparatus according to claim 5, wherein
    the predetermined angle is about 45 degrees.

7. The image pickup apparatus according to claim 1, wherein
    the display unit includes a hinge member capable of holding the display unit in a state in which the display unit is rotated with respect to the housing around at least two rotation axes substantially perpendicular to each other as rotation centers and is inclined, and
    the user state detection unit is disposed, in a case that the display unit is rotated by a predetermined angle or more with respect to a second rotation axis parallel to a latitudinal direction of the display unit so that the display unit faces toward a right side surface direction in a front view of the housing, at a position preventing the display unit from blocking the detection range of the user state detection unit.

8. The image pickup apparatus according to claim 7, wherein
    the predetermined angle is about 45 degrees.

9. The image pickup apparatus according to claim 1, wherein
    the user state detection unit is mounted in a state in which an optical axis of an angle of view of the user state detection unit is inclined with respect to an optical axis direction of the image pickup apparatus.

10. The image pickup apparatus according to claim 1, further comprising:
    a driving mechanism configured to drive the user state detection unit; and an apparatus state detection unit configured to detect a state of the image pickup apparatus, and wherein the driving mechanism drives the user state detection unit based on information indicating the state detected by the apparatus state detection unit.

11. The image pickup apparatus according to claim 1, wherein the user state detection unit is provided inside the rear surface of the housing via a holding member, which holds the user state detection unit, so as to face toward a user side.

12. The image pickup apparatus according to claim 11, wherein a periphery of the user state detection unit is covered with a standing wall shape, which is provided inside the rear surface of the housing, and the holding member.

13. The image pickup apparatus according to claim 11, wherein the holding member is a sheet metal having conductivity.

14. The image pickup apparatus according to claim 11, wherein a transparent cover member is provided on a user side of the user state detection unit.

15. The image pickup apparatus according to claim 1, further comprising:

a finder having a shape protruding from the rear surface of the housing; and an eye cup disposed so as to surround the finder, and wherein the user state detection unit is disposed inside the eye cup and outside an opening portion of the finder.

16. The image pickup apparatus according to claim 15, further comprising:

an eye-contact detection unit that includes a light source configured to emit light and a light receiving element configured to receive reflected light of the light source, and detects an eye-contact state of the user based on an amount of light received by the light receiving element, and wherein the light receiving element is disposed between the user state detection unit and the light source.

17. The image pickup apparatus according to claim 16, wherein the user state detection unit is further disposed within a projection plane of a window member provided on a user side of the eye-contact detection unit.

18. The image pickup apparatus according to claim 16, wherein the user state detection unit is mounted on a same flexible printed circuit board as the eye-contact detection unit, the user state detection unit and the eye-contact detection unit are configured to abut on a frame body disposed on a user side of the user state detection unit and a user side of the eye-contact detection unit by being biased by one elastic member, and a slit is formed, on the same flexible printed circuit board, between the user state detection unit and the eye-contact detection unit.

* * * * *